United States Patent
Bush et al.

(10) Patent No.: US 8,923,838 B1
(45) Date of Patent: Dec. 30, 2014

(54) SYSTEM, METHOD AND COMPUTER PROGRAM PRODUCT FOR ACTIVATING A CELLULAR PHONE ACCOUNT

(75) Inventors: Ryan J. Bush, Belmont, CA (US); Vipul Niranjan Vyas, Mountain View, CA (US)

(73) Assignee: Nuance Communications, Inc., Burlington, MA (US)

( * ) Notice: Subject to any disclaimer, the term of this patent is extended or adjusted under 35 U.S.C. 154(b) by 258 days.

(21) Appl. No.: 10/923,342

(22) Filed: Aug. 19, 2004

(51) Int. Cl.
*H04M 3/00* (2006.01)

(52) U.S. Cl.
USPC ............. 455/419; 379/88.18; 379/88.01; 705/9; 705/26.8; 705/18; 705/26.62; 705/65; 704/277; 704/231; 455/408; 455/409; 455/569.1; 455/563

(58) Field of Classification Search
CPC ............. H04M 2203/303; H04M 2203/551; H04M 3/5166; H04M 3/53333
USPC ......... 455/408, 409, 406, 79, 563, 569.1, 419, 455/411, 414.1, 435.1; 704/270, 277; 705/65, 14; 340/870.11
See application file for complete search history.

(56) References Cited

U.S. PATENT DOCUMENTS

| | | | |
|---|---|---|---|
| 4,164,025 A | | 8/1979 | Dubnowski et al. |
| 4,697,282 A | | 9/1987 | Winter et al. |
| 4,918,322 A | | 4/1990 | Winter et al. |
| 4,945,557 A | * | 7/1990 | Kaneuchi et al. ......... 379/88.03 |
| 5,386,455 A | | 1/1995 | Cooper ........................ 379/58 |
| 5,553,119 A | | 9/1996 | McAllister et al. |
| 5,638,425 A | | 6/1997 | Meador et al. |
| 5,677,990 A | | 10/1997 | Junqua |
| 5,724,481 A | | 3/1998 | Garberg et al. |
| 5,799,065 A | | 8/1998 | Junqua et al. |
| 5,819,265 A | | 10/1998 | Ravin et al. |
| 5,875,394 A | * | 2/1999 | Daly et al. ................... 455/411 |
| 5,946,613 A | * | 8/1999 | Hayes et al. ................. 455/406 |
| 5,991,720 A | | 11/1999 | Galler et al. |
| 5,991,739 A | * | 11/1999 | Cupps et al. ................ 705/26.8 |
| 6,016,336 A | * | 1/2000 | Hanson ..................... 379/88.23 |
| 6,125,347 A | * | 9/2000 | Cote et al. .................... 704/275 |
| 6,167,383 A | | 12/2000 | Henson |
| 6,173,266 B1 | | 1/2001 | Marx et al. |
| 6,208,965 B1 | | 3/2001 | Brown et al. |
| 6,216,111 B1 | | 4/2001 | Walker et al. |
| 6,253,174 B1 | * | 6/2001 | Ishii et al. .................... 704/231 |
| 6,314,165 B1 | | 11/2001 | Junqua et al. |
| 6,334,103 B1 | | 12/2001 | Surace et al. |
| 6,363,357 B1 | | 3/2002 | Rosenberg et al. |
| 6,404,876 B1 | | 6/2002 | Smith et al. |
| 6,473,734 B1 | | 10/2002 | Dvorak |

(Continued)

FOREIGN PATENT DOCUMENTS

WO    WO 02/069220    9/2002

OTHER PUBLICATIONS

Simoudis, E. (2000). If it's not one channel, then it's another. Bank Marketing, 32(1), 48-50+.

*Primary Examiner* — Charles Shedrick
(74) *Attorney, Agent, or Firm* — Lessani Law Group, PC

(57) ABSTRACT

A system, method and computer program product are provided for activating a cellular phone account utilizing automated speech recognition. In use, information about a user is received over a network utilizing automated speech recognition. Thereafter, a cellular phone account is activated based on the information received utilizing the automated speech recognition.

28 Claims, 12 Drawing Sheets

(56) References Cited

U.S. PATENT DOCUMENTS

| | | | |
|---|---|---|---|
| 6,490,521 B2 | 12/2002 | Wiener | |
| 6,526,273 B1* | 2/2003 | Link et al. | 455/406 |
| 6,584,180 B2 | 6/2003 | Nemoto | |
| 6,587,558 B2 | 7/2003 | Lo | |
| 6,618,704 B2 | 9/2003 | Kanevsky et al. | |
| 6,650,887 B2* | 11/2003 | McGregor et al. | 455/406 |
| 6,654,447 B1* | 11/2003 | Dewan | 379/76 |
| 6,662,163 B1 | 12/2003 | Albayrak et al. | |
| 6,728,353 B1 | 4/2004 | Espejo et al. | |
| 6,731,737 B2 | 5/2004 | Davis | |
| 6,792,102 B2 | 9/2004 | Shires | |
| 6,853,987 B1 | 2/2005 | Cook | |
| 6,876,728 B2 | 4/2005 | Kredo et al. | |
| 6,917,802 B1* | 7/2005 | Nilsson | 455/419 |
| 6,941,273 B1* | 9/2005 | Loghmani et al. | 705/26.62 |
| 6,985,753 B2* | 1/2006 | Rodriguez et al. | 455/550.1 |
| 6,996,531 B2* | 2/2006 | Korall et al. | 704/270 |
| 7,006,971 B1 | 2/2006 | Stahl et al. | |
| 7,023,979 B1 | 4/2006 | Wu et al. | |
| 7,143,037 B1 | 11/2006 | Chestnut | |
| 7,424,427 B2 | 9/2008 | Liu et al. | |
| 7,487,095 B2 | 2/2009 | Hill et al. | |
| 7,529,678 B2 | 5/2009 | Kobal | |
| 7,724,878 B2 | 5/2010 | Timmins et al. | |
| 7,783,755 B2 | 8/2010 | Goss et al. | |
| 7,881,703 B2 | 2/2011 | Roundtree et al. | |
| 8,081,749 B1 | 12/2011 | Shaffer et al. | |
| 2001/0010714 A1 | 8/2001 | Nemoto | |
| 2001/0011230 A1* | 8/2001 | Morganstein et al. | 705/18 |
| 2001/0037241 A1 | 11/2001 | Puri | |
| 2001/0039492 A1 | 11/2001 | Nemoto | |
| 2001/0056359 A1 | 12/2001 | Abreu | |
| 2002/0010000 A1 | 1/2002 | Chern et al. | |
| 2002/0034940 A1 | 3/2002 | Takae et al. | |
| 2002/0065736 A1 | 5/2002 | Willner et al. | |
| 2002/0077833 A1* | 6/2002 | Arons et al. | 704/277 |
| 2002/0077898 A1* | 6/2002 | Koulouris | 705/14 |
| 2002/0087323 A1 | 7/2002 | Thomas | |
| 2002/0103641 A1* | 8/2002 | Kuo et al. | 704/231 |
| 2002/0120582 A1 | 8/2002 | Elston et al. | 705/64 |
| 2002/0168986 A1* | 11/2002 | Lau et al. | 455/456 |
| 2002/0169618 A1 | 11/2002 | Caspari | |
| 2002/0177914 A1 | 11/2002 | Chase | |
| 2003/0007464 A1 | 1/2003 | Balani | |
| 2003/0023439 A1 | 1/2003 | Ciurpita et al. | |
| 2003/0050043 A1* | 3/2003 | Ohrstrom et al. | 455/406 |
| 2003/0061171 A1* | 3/2003 | Gilbert et al. | 705/65 |
| 2003/0130904 A1 | 7/2003 | Katz et al. | |
| 2003/0162561 A1 | 8/2003 | Johnson et al. | |
| 2003/0177009 A1 | 9/2003 | Odinak et al. | |
| 2003/0185359 A1 | 10/2003 | Moore et al. | |
| 2003/0204444 A1 | 10/2003 | Van Luchene et al. | |
| 2004/0012501 A1* | 1/2004 | Mazzara et al. | 340/870.11 |
| 2004/0019487 A1 | 1/2004 | Kleindienst et al. | |
| 2004/0047453 A1* | 3/2004 | Fraser | 379/88.18 |
| 2004/0111267 A1 | 6/2004 | Jadhav et al. | |
| 2004/0161097 A1 | 8/2004 | Henry | |
| 2004/0162724 A1 | 8/2004 | Hill et al. | |
| 2004/0185833 A1* | 9/2004 | Walden et al. | 455/414.1 |
| 2004/0242209 A1* | 12/2004 | Kruis et al. | 455/414.1 |
| 2005/0044254 A1* | 2/2005 | Smith | 709/231 |
| 2005/0163296 A1 | 7/2005 | Smith et al. | |
| 2005/0177368 A1 | 8/2005 | Odinak | |
| 2005/0183032 A1 | 8/2005 | Bushey et al. | |
| 2005/0201540 A1* | 9/2005 | Rampey et al. | 379/142.14 |
| 2005/0222712 A1* | 10/2005 | Orita | 700/246 |
| 2005/0261990 A1 | 11/2005 | Gocht et al. | |
| 2006/0009218 A1* | 1/2006 | Moss | 455/435.1 |
| 2006/0080107 A1 | 4/2006 | Hill et al. | |
| 2006/0100851 A1* | 5/2006 | Schonebeck | 704/9 |
| 2006/0106610 A1 | 5/2006 | Napper | |
| 2006/0126804 A1* | 6/2006 | Lee et al. | 379/88.01 |
| 2007/0117584 A1 | 5/2007 | Davis et al. | |

* cited by examiner

SYSTEM, METHOD AND COMPUTER PROGRAM PRODUCT FOR ACTIVATING A CELLULAR PHONE ACCOUNT

FIELD OF THE INVENTION

The present invention relates to cellular phones, and more particularly to activating cellular phone accounts.

BACKGROUND OF THE INVENTION

Cellular telephone use in the United States has dramatically increased over the past few years. In recent years, the size of the cellular telephone units have shrunk considerably, and portable and handheld units have become commonplace. Mass retailers have replaced specialty dealers and former distribution and installation systems. The mass retailer concentrates on selling the consumer a cellular telephone and prefers to spend less time installing or "activating" the purchased cellular telephones, as their time can be spent elsewhere at a greater profit.

Currently, activation is a long process starting with a sale of the cellular telephone by the retailer. The buyer then fills out an application for service on a form supplied by a predetermined carrier. The application requests identifying subscriber (buyer) information, plus some information about the particular cellular telephone for the carrier's information. Once the application is completed, the retailer then communicates the application information to the carrier where it is reviewed for credit worthiness, etc. If approved, the cellular telephone information is entered into the carrier's wireless system.

To date, the activation process is manually done by the retailer's technician or even sales clerk, or humans via a call center or the like. Unfortunately, the use of retailer employees and humans for such activation process is cumbersome and expensive.

There is thus a need for a system that utilizes an automated process for activation of cellular phone accounts. While such automated processes have been developed for accessing various services (i.e. stock quotes, weather information, sports information, etc.), there has been no automation of the cellular phone account activation process.

SUMMARY OF THE INVENTION

A system, method and computer program product are provided for activating a cellular phone account utilizing automated speech recognition. In use, information about a user is received over a network utilizing automated speech recognition. Thereafter, a cellular phone account is activated based on the information received utilizing the automated speech recognition.

In one embodiment, a state of interaction with the user may be stored during the receipt of the information. Thus, the receipt of information may be capable of being interrupted, and subsequently continued based on the state of interaction.

As an option, the information may be collected via a human instead of utilizing the automated speech recognition, upon predetermined criteria being met. For example, such predetermined criteria may be met upon a difficulty arising with the receipt of the information utilizing the automated speech recognition.

Furthermore, in another embodiment, the information may include an electronic serial number (ESN) or an International Mobile Equipment Identity (IMEI), the name of the user, the date of birth of the user, a zip code (which may be utilized for identifying coverage information associated with the cellular phone account, and/or for billing associated with the cellular phone account), an address of the user (which may or may not correspond to the zip code previously given; furthermore, some parts of the address may be optional), and/or various aspects of the cellular phone account to be activated [i.e. subscriber identify module (SIM) card number, etc.]. Optionally, the name may include a natural pronunciation of the name and a spelling of the name for increasing the accuracy of the automated speech recognition of the name, or the transcription of the name by a human.

In yet additional embodiments, marketing information may be audibly transmitted to the user over the network, as well as instructional information. As an option, such instructional information may be audibly transmitted to the user over the network for facilitating the programming of the cellular phone by the user. Further, the instructional information may be tailored based on the cellular phone of the user.

Optionally, a first sub-set of the information may be required for the activation of the cellular phone account and a second sub-set of the information may not be necessarily required for activation. Thus, the cellular phone account may be activated despite a failure in the receipt of the second sub-set of the information.

In still another embodiment, utterances made by the user may be stored during the receipt of the information. Thus, a human may manually transcribe the dialog later. This technique may be used to capture information that is difficult to recognize using automated speech recognition.

Optionally, the types of cellular phone accounts that can be activated may include a pre-paid account and/or any other type of cellular phone account. Further, the receipt of the information may be prompted in various ways. For example, if the user calls a customer service line and their caller identification number is not recognized, they may be immediately offered the opportunity to activate a phone by giving some command, without first logging in. Further, if a user whose phone is already activated calls a customer service line, after the user logs in at the main menu, they are offered the opportunity to activate a phone by giving some command. Still yet, the user may call a predetermined "activation" phone number.

During use, audible confirmations may be conditionally transmitted to the user over the network, based on a confidence score associated with the information received from the user. Still yet, if there is a delay caused by a backend subsystem, the delay may be masked by requesting additional information from the user.

DETAILED DESCRIPTION

Figure 1:
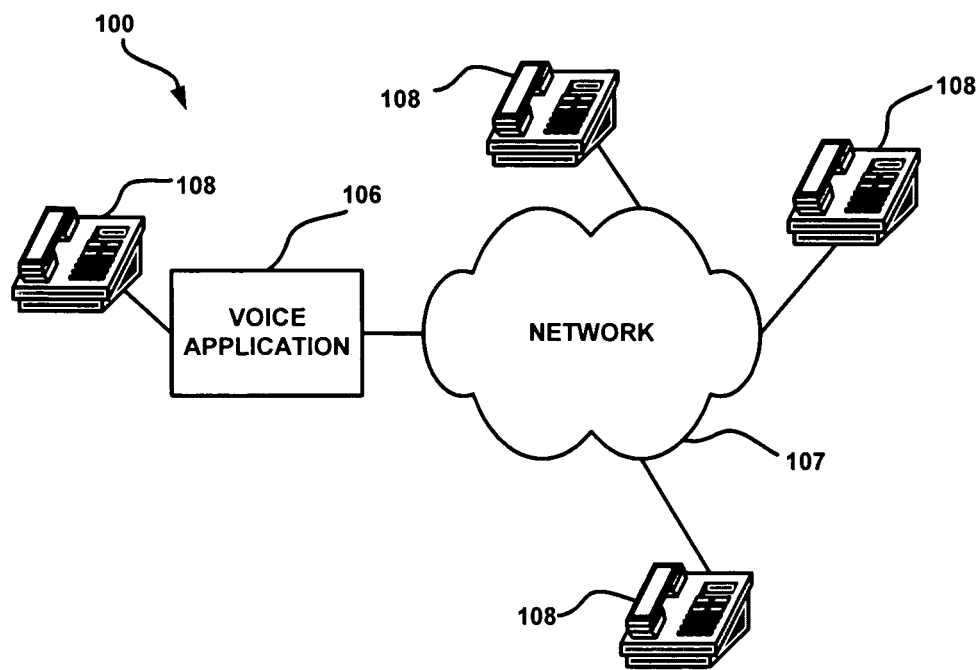
FIG. 1 illustrates an exemplary architecture, in accordance with one embodiment.

FIG. 1 illustrates an exemplary architecture 100, in accordance with one embodiment. As shown, a network 107 is provided. In the context of the present architecture 100, the network 107 may take any form including, but not limited to a local area network (LAN), a wide area network (WAN) such as the Internet, a telecommunications network, etc.

As shown, the network 107 interconnects a plurality of telephones 108. It should be noted that, in the context of the present description, such telephones 108 may take the form of stationary, mobile, analog and/or digital communication devices capable of communicating voice communications. Moreover, such telephones 108 may be dispersed both locally and at a global scale.

With continuing reference to FIG. 1, a speech recognition application 106 is provided for activating a cellular phone account of a cellular phone (not shown), utilizing automated speech recognition. In use, information about a user is received over the network 107 utilizing automated speech recognition. Thereafter, a cellular phone account is activated based on the information received utilizing the automated speech recognition.

More exemplary information will now be set forth regarding various hardware and software functionality options associated with the foregoing architecture.

Figure 2:
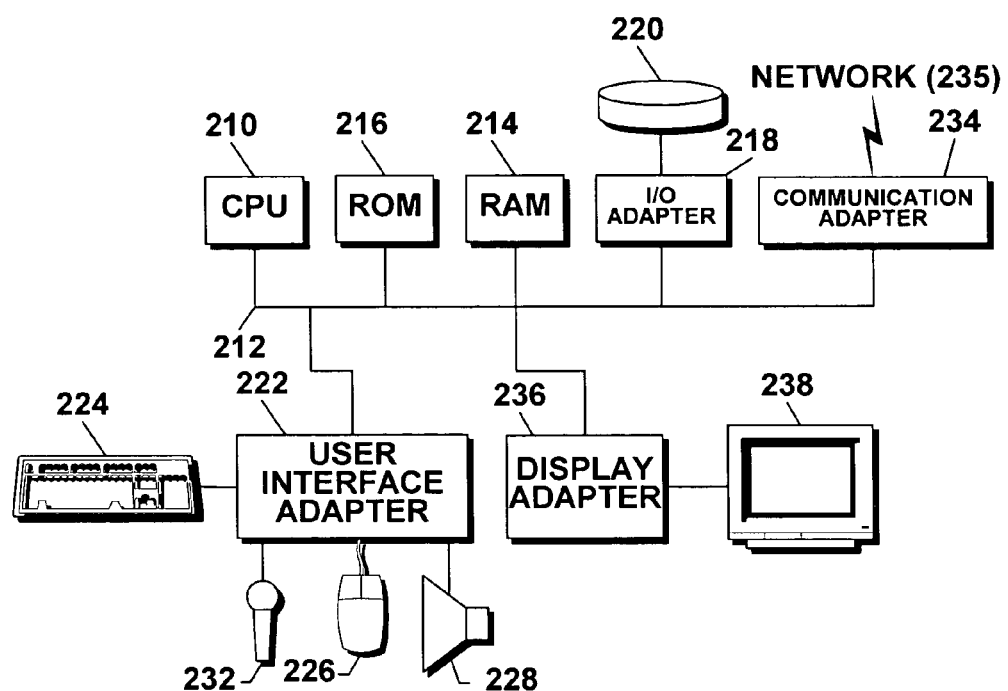
FIG. 2 shows a representative hardware environment on which the speech recognition application and even the telephones of FIG. 1 may be implemented, in accordance with one embodiment.

FIG. 2 shows a representative hardware environment on which the speech recognition application 106 and even the telephones 108 of FIG. 1 may be implemented, in accordance with one embodiment. Such figure illustrates an exemplary hardware configuration of a workstation in accordance with one embodiment having a central processing unit 210, such as a microprocessor, and a number of other units interconnected via a system bus 212. Of course, the various components of FIG. 1 may be implemented in any desired hardware environment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows Operating System (OS), the IBM OS/2 operating system, the MAC OS, or UNIX operating system. It will be appreciated that a preferred embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
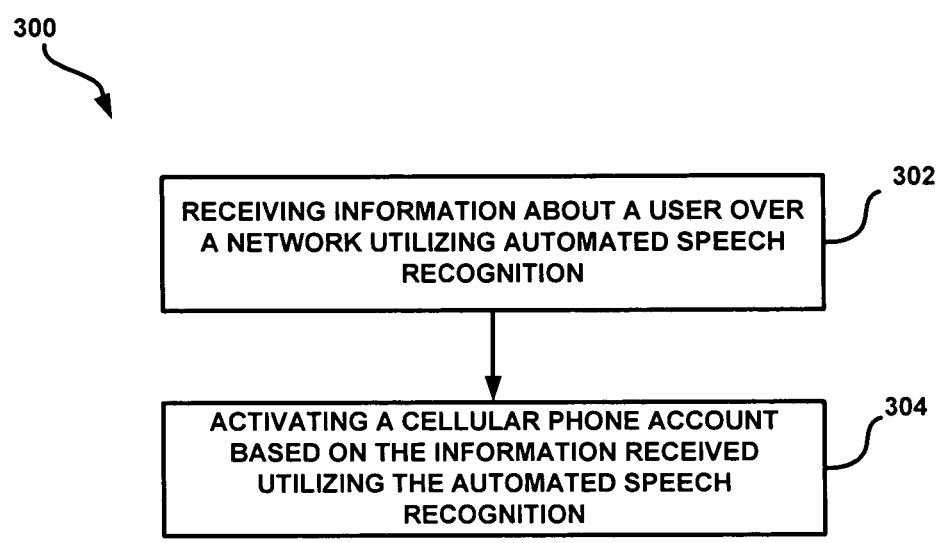
FIG. 3 illustrates a method for activating a cellular phone account utilizing automated speech recognition, in accordance with one embodiment.

FIG. 3 illustrates a method 300 for activating a cellular phone account utilizing automated speech recognition, in accordance with one embodiment. As an option, the present method 300 may be implemented in the context of the architecture of FIGS. 1 and 2. Of course, the method 300 may be implemented in any desired context.

As set forth in operation 302, information about a user is received over a network (see, for example, the network 107 in FIG. 1) utilizing automated speech recognition. Such information collection process may be prompted by a user calling a predetermined "activation" phone number. Further, such information collection process may be initiated when a user calls a customer help line or some other service which requires activation, and a caller identification number is unrecognized. In that case, they are immediately offered the opportunity to activate a phone by giving some command, without first logging in. And, if a user whose phone is already activated calls a customer service line, after the user logs in at the main menu, they are also offered the opportunity to activate a phone by giving some command.

In the context of the present description, the aforementioned information may include an electronic serial number (ESN or IMEI), the name of the user, the date of birth of the user, a ZIP code, an address, various aspects of the cellular phone account to be activated, and/or any other information which is required or facilitates activation of a cellular phone account. Of course, any information may be received (i.e. e-mail address, rate plan, language preference, subscriber identify module (SIM) card number, etc.)

An electronic serial number (ESN or IMEI) is the unique identification number embedded or inscribed on the microchip in a cellular phone by a manufacturer. Often, the ESN can be obtained from the cellular phone itself or an associated box. Each time a call is placed, the ESN is automatically transmitted to the base station so a wireless carrier mobile switching office can check call validity. The ESN differs from a mobile identification number (MIN), which is a wireless carrier identifier for a phone in a network.

Optionally, the name may include a natural pronunciation of the name (i.e. "John") and a spelling of the name ("J-"o"-"h"-"n") for increasing the accuracy of the automated speech recognition of the name. This may be accomplished by comparing the spoken name with a grammar generated from the spelling of the name (using speech recognition). For example, if the user spells his name as "T-O-M", the grammar generated may include "Tom" and "Dom". The user's spoken utterance "Tom" would be checked against that grammar, and the correct result of "Tom" could be obtained. The order in which the system prompts the user to say their name and spell may be independent of this process. The recognition process may begin after both name and spelling are collected, or may begin after at least the spelling is collected.

Further, the zip code may be utilized for identifying coverage information associated with the cellular phone account, and/or for billing associated with the cellular phone account.

Still yet, with respect to the various aspects of the cellular phone account, such aspects may range from available features (i.e. call waiting, caller i.d., etc.) to more fundamental aspects, such as pricing, etc.

Again, all of the foregoing information may be collected using speech recognition, thus automating the activation process. To facilitate such automated process, audible confirmations may be conditionally transmitted to the user over the network, based on a confidence score associated with the information received from the user. In the context of the present invention, such confidence score may include any indicator as to the perceived accuracy of the automated speech recognition. Using one exemplary technique, the aforementioned utterance may be recorded and recognized for comparison to a certain grammar that is active. The closer the recognized utterance matches a phrase in the grammar, the higher the confidence score. The higher the confidence score, the less need there is for an explicit audible confirmation. The confirmations used may range from an explicit yes or no confirmation (such as "210 Main Street. Is that right?"), to an implicit confirmation (such as "210 Main Street. If that's not right, say 'go back'."), to a non-confirmation (where the system doesn't echo back the recognized utterance at all).

In order to accommodate intentional or unintentional pauses or breaks in the information collection process (i.e. accidental hang-up, speech recognition application failure or slowdown, etc.), a state of interaction with the user may be stored during the receipt of the information. Such state may include the identity of the user as well as stored information already collected via the speech recognition process. Thus, the receipt of information may be capable of being interrupted, and subsequently continued based on the state of interaction. This may be accomplished by the user simply calling the application again, and providing their identity.

As an option, the information may be collected via a human instead of and/or in addition to utilizing the automated speech recognition. For example, the automated speech recognition process may be ceased and the human connected to the user, upon predetermined criteria is met. For example, such predetermined criteria may be met upon a difficulty arising with the receipt of the information utilizing the automated speech recognition. Of course, such difficulty may arise from either problems with the speech recognition application or the user.

Humans may further be used to enhance the user experience, even if they are not available in real (or near real)-time. For example, user's utterance may be stored during the receipt of the information in operation 302. Thus, a human (or multiple humans) may manually transcribe the dialog after the user's call is done. As will soon be set forth, some information collected from the user is mandatory for account activation, while other information is optional. Thus, the present feature may be employed for optional information, so that activation may proceed without delay.

As yet another option for dealing with any sort of delay, additional information may be requested from the user or provided to the user, upon a delay occurring by a backend subsystem carrying out the automated speech recognition. To this end, the user is occupied while the delay is corrected by the automated speech recognition application. Of course, if the delay is significant, the various other foregoing techniques may be employed.

Upon receipt of the necessary information, a cellular phone account is activated based on the information received utilizing the automated speech recognition. See operation 304. In the context of the present description, the cellular phone account may include a new cellular phone, a pre-paid cellular phone account, a rate plan, and/or any other type of account associated with a cellular phone.

As an option, marketing information, as well as instructional information, may be audibly transmitted to the user over the network, during the activation method 300 of FIG. 3. Such instructional information may be audibly transmitted to the user over the network for facilitating the programming of the cellular phone by the user. Further, the instructional information may be tailored based on the cellular phone of the user.

As mentioned previously, some information collected from the user is mandatory for account activation, while other information is unnecessary. Thus, a first sub-set of the information (i.e. name, ZIP code, etc.) may be required for the activation of the cellular phone account and a second sub-set of the information (i.e. service preferences, etc.) is not required for the activation of the cellular phone account. Thus, the cellular phone account may be activated despite a failure in the receipt of the second sub-set of the information. Moreover, as an option, the human may be relied upon, if necessary, for only the first sub-set of the information, since the second sub-set of the information may be less important.

More information will now be set forth regarding an exemplary method for activating a cellular phone account as well as providing various ancillary features. It should be noted that the following example is set forth for illustrative purposes only and should not be considered limiting in any manner.

FIGS. 4A-4C-6 illustrate an exemplary method 400 for activating a cellular phone account as well as providing various ancillary features, in accordance with one embodiment. As an option, the present method 400 may be implemented in the context of the architecture of FIGS. 1 and 2. Still yet, the exemplary method 400 may include the method 300 of FIG. 3. Of course, the method 400 may be implemented in any desired context. For example, any of the methods in FIGS. 4A, 4B, and 4C-1-6 may be optionally included/excluded, as desired.

Figure 4A:
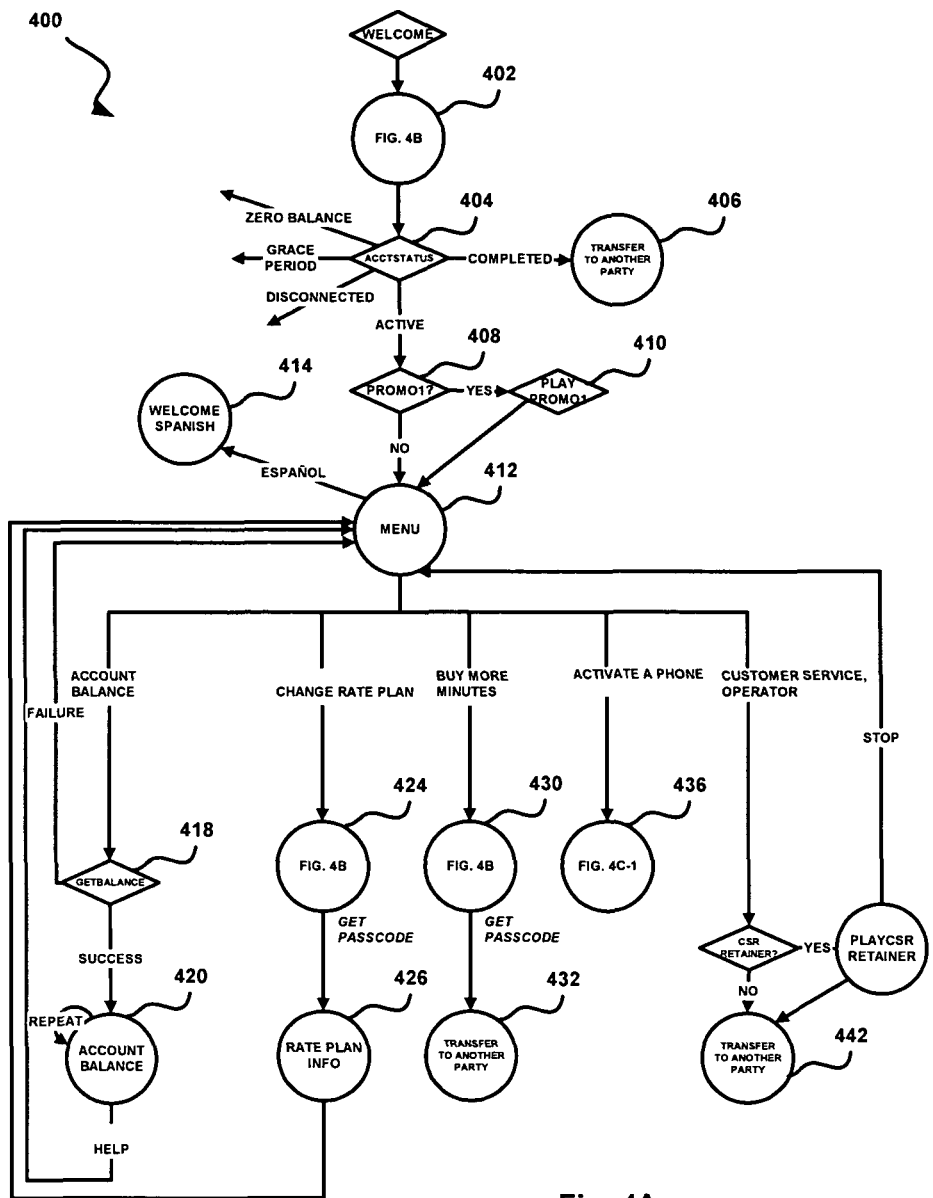
FIGS. 4A-4C-6 illustrate an exemplary method for activating a cellular phone account as well as providing various ancillary features, in accordance with one embodiment.

With reference initially to FIG. 4A, a log-in module 402 is executed to log-in a user, and obtain their cellular phone account number. One exemplary method of logging in a user will be set forth in greater detail during reference to FIG. 4B.

It is then determined in decision 404 as to whether the user's cellular phone account is active (already activated or ready for cellular phone account activation by the user). This decision is based on the information collected by the log-in module 402. If it is not, the call may be transferred to another party (see operation 406), or be otherwise handled based on whether there is a zero balance, grace period, and/or disconnection.

If, however, it is determined in decision 404 that the cellular phone account is active, audible marketing information is conditionally sent to the user over the network in operation 410, based on decision 408. Thereafter, in operation 412, a menu is vocalized to the user. Table 1 illustrates exemplary menu dialog.

TABLE 1

1st time through:
"How can I help you? You can say 'account balance', 'change my rate plan', 'buy more minutes', 'activate a phone', or 'customer service'."
2nd time through:
"If there's anything else I can help you with, you can say 'account balance', 'change my rate plan', 'buy more minutes', 'activate a phone', or 'customer service'."

The menu information describes an account balance option, a change rate plan option, a purchase minutes option, an activate phone option, and a customer service option. Upon selection of one of the options, the user is provided an opportunity to "go back" to the menu by verbally stating the same.

Upon selection of the account balance option, it is determined whether the balance is available in decision 418. If not, a failure message is communicated to the user and the menu information is again communicated in operation 412. If the balance is available, audible account balance information is communicated over the network, and repeated as necessary. Note operation 420. The audible menu information is then repeated in accordance with operation 412.

Upon selection of the change rate plan option, the login module is executed to obtain a pass code, in operation 424. One exemplary method of logging in a user will be set forth in greater detail during reference to FIG. 4B. Thereafter, audible rate plan information is communicated over the network. See operation 426.

Upon selection of the purchase minutes option, the login module is executed to obtain a pass code, in operation 430. Again, one exemplary method of logging in a user will be set forth in greater detail during reference to FIG. 4B. Next, in operation 432, purchase minutes information is communicated over the network by transferring the caller to another party to manage the transaction.

Upon selection of the customer service option, audible customer service information is communicated over the network, as indicated in operation 442. Finally, upon selection of the activate phone option, information about the user is received over the network utilizing automated speech recognition. Further, a cellular phone account is activated based on the information received utilizing the automated speech recognition. Such features are carried out in operation 432. One exemplary method for implementing the voice activation option will be set forth in greater detail during reference to FIGS. 4C-1-4C-6.

Figure 4B:
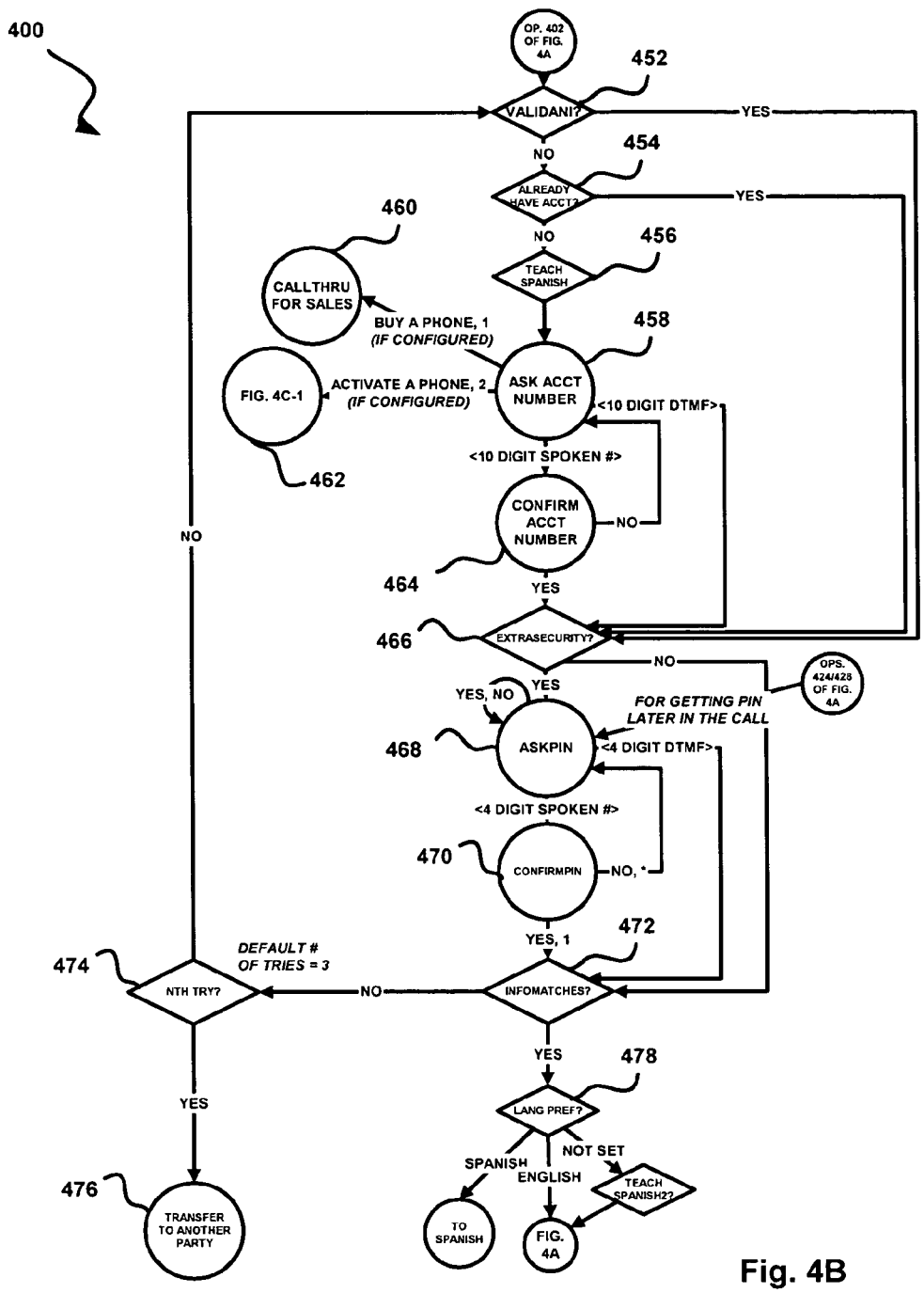

With reference now to FIG. 4B, a log-in process is shown, in accordance with operations 402, 424, and 430 of FIG. 4A. Such log-in process is set forth for illustrative purposes, and should not be construed as limiting in any manner. Different log-in processes (or even no log-in process) may be substituted, per the desires of the administrator.

In operation 452, it is determined whether the automatic number identifier (ANI) is valid. An ANI is a service that provides the receiver of a telephone call with the number of the calling phone. The method of providing this information is determined by the service provider. The service is often provided by sending the digital tone multi frequency (DTMF) tones along with the call.

If the ANI is not valid, it is determined whether the caller already has a cellular phone account in decision 454. It should be noted that the instructions may also be provided in another language per operation 456. If the cellular phone account is not already in place, it is then determined in operation 458 whether the user wishes to purchase a phone (see operation 460) or activate a phone (see operation 462). Exemplary dialog for accomplishing this is set forth in Table 2.

TABLE 2 if from 611: "What's your 10-digit mobile number?"
if from 800 number: "If you're already a Prepaid customer, please say or enter your 10-digit mobile number. Or if you've just bought a Phone and need to activate it, say 'activate a phone'."

During operation 458, the 10 digit mobile number is requested, and confirmed in operation 464, if spoken by the user as opposed to being typed into the phone. It is then determined whether additional security is necessary in decision 466. In short, no additional security is required if the present instance is an initial login, or if the application has the pass code. However, if the change rate plan option or buy more minutes option is requested, additional security is required.

If additional security is required, a personal identification number (PIN) is requested in operation 468. During operation 470, the PIN is confirmed if spoken by the user as opposed to being typed into the phone. If the information does not match the appropriate records, the process is repeated at operation 452, unless the process fails a predetermined number of instances per decision 474, in which case the call is transferred in operation 476.

If, on the other hand, the information does match the appropriate records, the process continues by determining a language preference in operation 478, and continuing operation in the appropriate point in FIG. 4A.

With reference now to FIGS. 4C-1, 4C-2, 4C-3, 4C-4, 4C-5, and 4C-6; an activation process is set forth, in accordance with operations 436 of FIG. 4A, and operation 462 of FIG. 4B. Such activation process is set forth for illustrative purposes, and should not be construed as limiting in any manner. As an option, the various features set forth during the description of FIG. 3 may be incorporated into the present activation process, and visa-versa.

Figures 1, 4C:
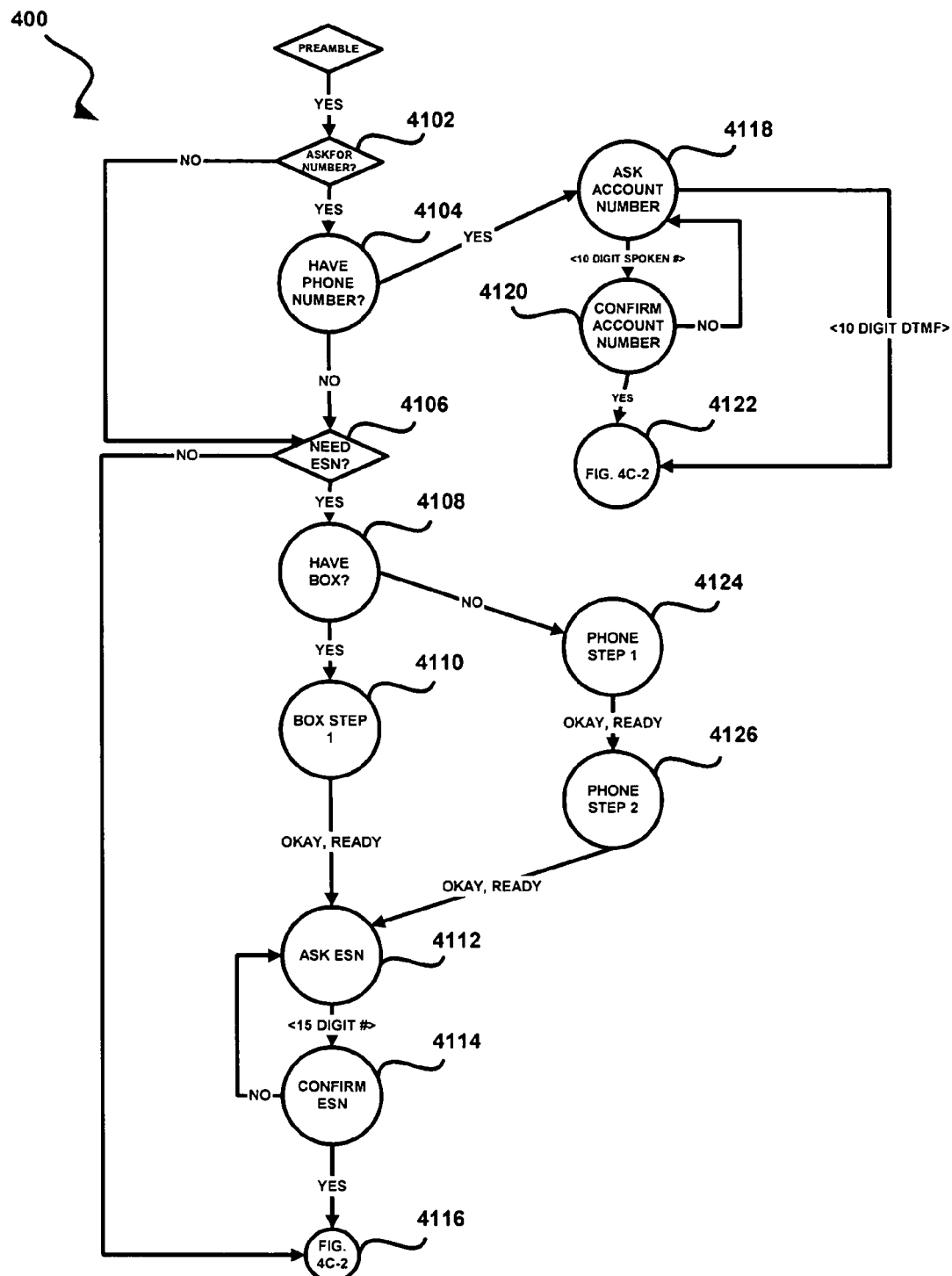
Figures 2, 4C:
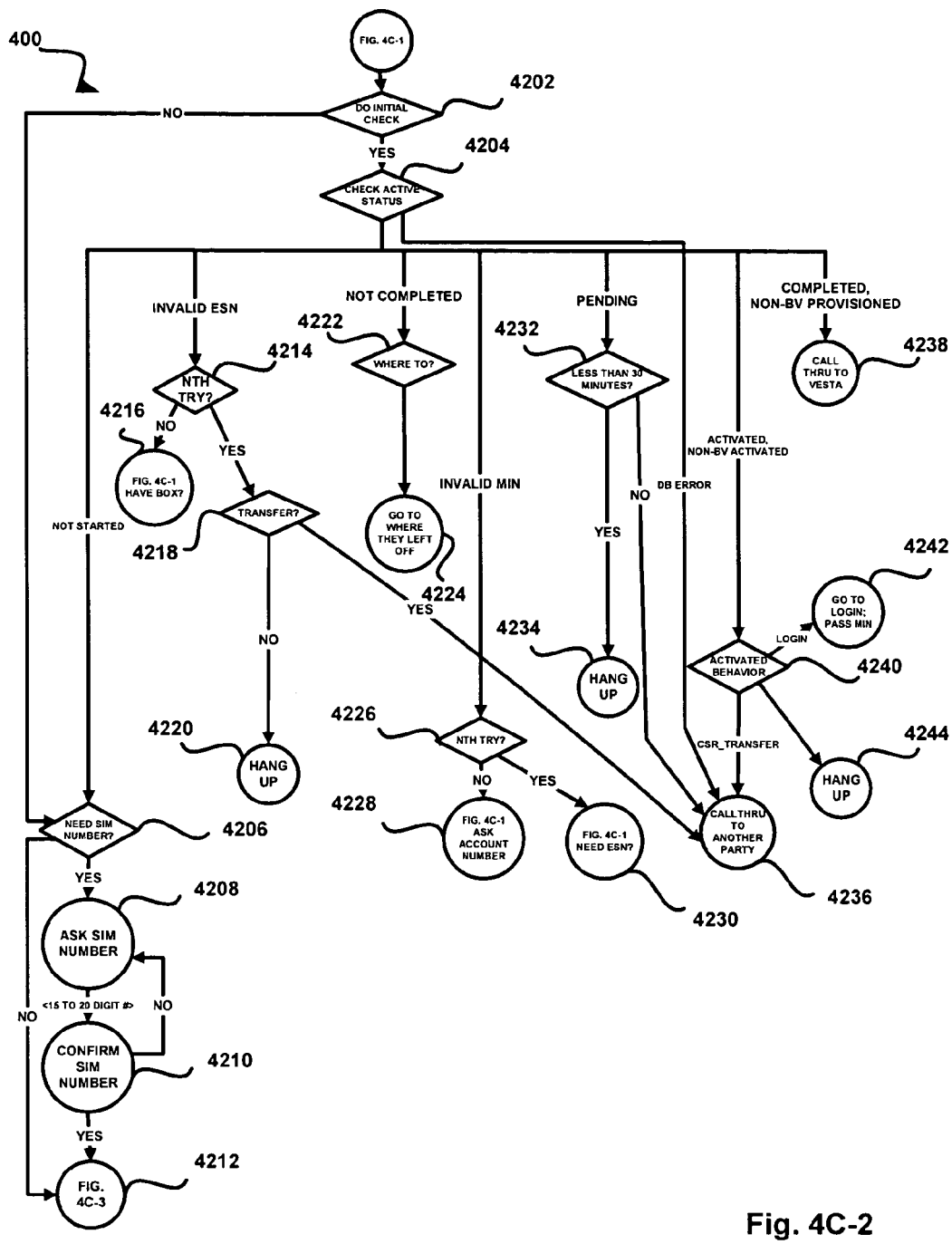
Figures 3, 4C:
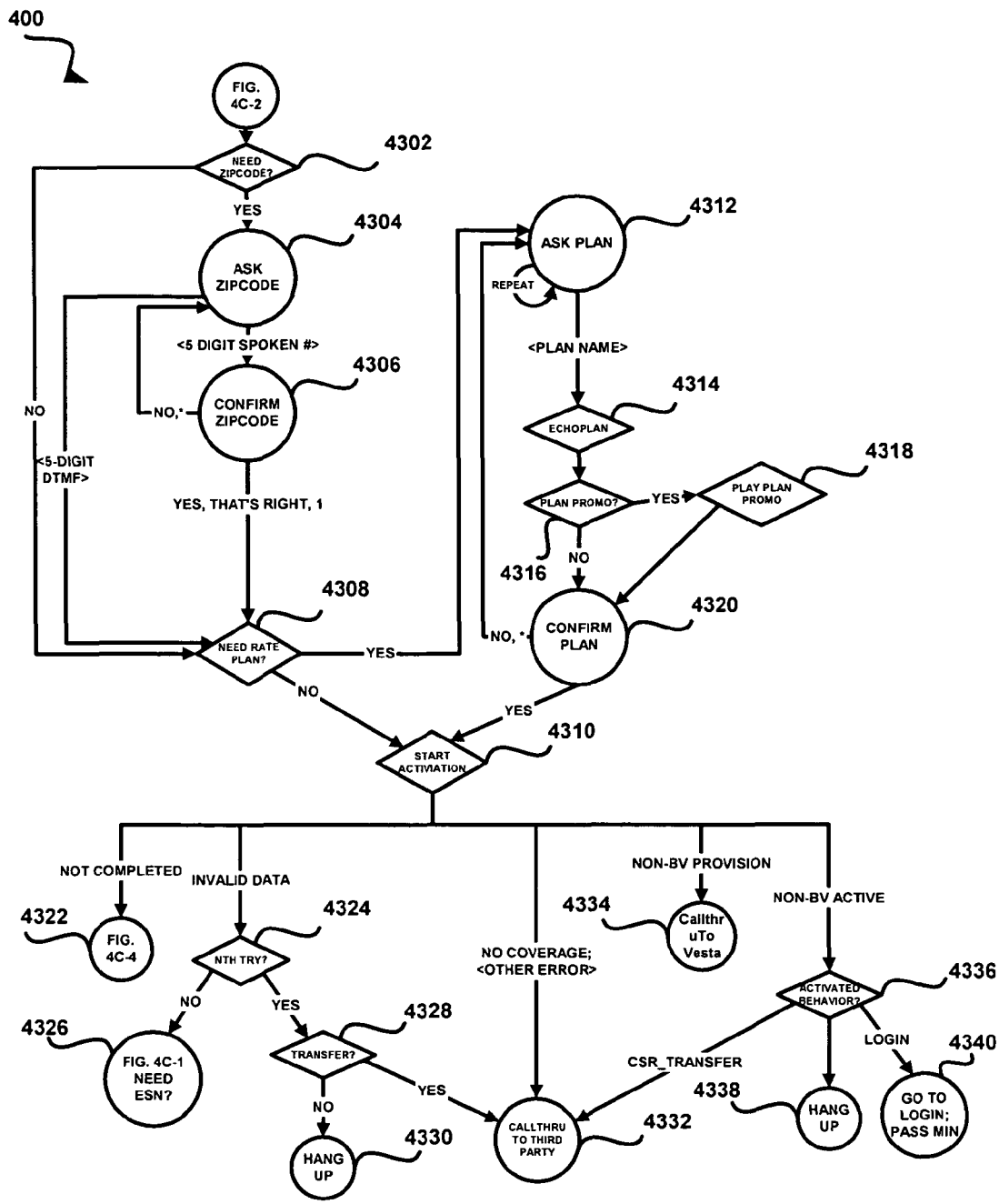

Turning attention to FIG. 4C-1, the start of an activation process is shown in which it is first determined whether the user must be asked if a phone number is already assigned to the cellular phone he wishes to activate in operation 4102. If it is necessary to obtain this information, the user is asked if a phone number already exists for the new phone in operation 4104. If the user does have an existing phone number, the user is then asked for that phone number, which may also be described as an account number in operation 4118.

The user may speak the phone number or use the telephone keypad to enter the phone number. If the phone number is spoken, a confirmation of the phone number is vocalized to the user in operation 4120, after which the user may agree with the confirmed number and continue with the activation process in operation 4122 or disagree and be taken back to operation 4118. If the phone number is entered using a keypad, the user automatically continues with the activation process in operation 4122 as described further in FIG. 4C-2.

If, however, it is determined in decision 4102 that it is not necessary to determine if a phone number is already assigned or if the user states that he does not already have an existing phone number, it is then determined whether the cellular phone serial number (ESN or IMEI), is required to continue with the activation process in operation 4106.

If a serial number is not required, the user automatically continues with the activation process in operation 4116 as described in FIG. 4C-2. Otherwise, the user is asked if he has the packaging for the cellular phone, in operation 4108. If the user does have the box, the user is asked to find the serial number on or in the box in operation 4110, and enter the serial number in operation 4112. If the user does not have the box, the user is prompted to open the cellular phone in operation 4124, prompted to find the serial number in operation 4126, and then prompted to enter the serial number in operation 4112.

After the serial number is spoken or entered, it is read back to the user in operation 4114 after which the user is required to agree or disagree with the confirmation. The user then proceeds with the activation process 4116 as described further in FIG. 4C-2.

FIG. 4C-2 illustrates the next part of the activation process during which it is determined whether the status of the activation must first be retrieved in operation 4202. If not, the activation process continues in operation 4206, which is described below.

On the other hand, if it is determined that the status of the activation process must first be retrieved in operation 4202, it is determined whether it is necessary to check the activation status of the cellular phone in operation 4204. In this case, there are eight different situations that may arise.

First, it may be determined that the serial number entered by the user is invalid, in which case the user may be taken back to operation 4108 in FIG. 4C-1 to ask if the user has the packaging in which the phone came (see operation 4216), as long as the user has not exceeded the number of allowable attempts to enter a valid serial number in operation 4214. If the number of allowable attempts has been exceeded, it is determined whether the user should be transferred in operation 4218 to an activation specialist from the cellular service provider in operation 4236 or the call ended in operation 4220.

Second, it may be determined that the activation has been started already (on a previous call, for example), but has not yet been completed, in which case the point at which the activation process was suspended is determined in operation 4222 and the user is sent to proceed accordingly in operation 4224.

Third, the mobile identification number (MIN) may be invalid, and if the number of allowable attempts to enter a valid MIN is exceeded per decision 4226, the user is directed (in operation 4230) back to operation 4106 in FIG. 4C-1 where it is determined whether a serial number is needed to proceed. If the number of allowable attempts has not been exceeded, the user is directed (in operation 4228) to operation 4118 in FIG. 4C-1 where the user is asked for his phone number associated with the cellular phone.

Fourth, the activation may be pending. For example, if the user has attempted to use the activation procedure less than thirty minutes after a previous activation attempt was been made by him in operation 4232, the second attempt will be terminated in operation 4234, by telling the user to call back in thirty minutes. If more than thirty minutes have passed since the last activation attempt, the user is transferred to an activation specialist from the cellular service provider in operation 4236.

Fifth, if a database error occurs during the activation process, the user will be transferred to an activation specialist from the cellular service provider in operation 4236.

Sixth, the activation status may show that the cellular phone has already been activated, either by this system or by a third party (such as the dealer that sold the phone). In that case, based on the decision in operation 4240, either the user will be logged in to the main customer service line (in operation 4242), the call will be transferred to a human (in operation 4236), or the call will be terminated (in operation 4244).

Seventh, the activation status may show that the process of activating the cellular phone was already started, either by this system or by a third party (such as the dealer that sold the phone), and all that remains to be done is the collection of information that cannot be done by the automated system. In that case, the call will be transferred to a human (in operation 4238).

Eighth, it may be determined that the activation process has not been started, in which case the activation process continues. It is next determined whether the SIM card number must be obtained for activation in operation 4206. The SIM card number is a 15 to 20 digit number located on the back of a small punch-out card included with the phone. If the SIM card number is necessary for activation, the user is asked for that number in operation 4208. A confirmation of the number is given in operation 4210 and the user may accept the confirmation and continue with the activation or reject the confirmation and be taken back to operation 4208.

FIG. 4C-3 continues the activation process by determining whether a zip code must be given by the user in operation 4302. If required, the zip code is requested in operation 4304, and a confirmation of the zip code is provided if spoken by the user in operation 4306. The process continues on to determine whether the user needs to choose a rate plan in operation 4308.

If the user does need to choose a rate plan, the user is asked which cellular phone rate plan is desired in operation 4312. The user's choice is then echoed back to the user in operation 4314 after which it is determined whether there is a promotion for the chosen plan in operation 4316. If there is a promotion, the promotion is vocalized to the user in operation 4318. Then more information about the plan is given, and the user is asked to confirm the chosen plan in operation 4320.

This concludes the collection of the information that is necessary to start the activation process. Next, the activation of the cellular phone is started in operation 4310.

If it is determined in operation 4308 that the user does not need a rate plan, then the user goes on to start activation in operation 4310.

The start activation operation has five avenues. First, it may be determined that the activation is not completed, in which case the user is taken to FIG. 4C-4 in operation 4322.

Second, it may be determined that the user has given invalid data. If the user has exceeded a predetermined threshold for the allowable number of attempts to enter valid data in operation 4324, it is next determined whether the user should be transferred in operation 4328 to an activation specialist from the cellular service provider in operation 4332 or whether the call should be terminated in operation 4330. If the user has not exceeded the allowable number of attempts to enter valid data, the user is returned to FIG. 4C-1 where it is determined whether an electronic serial number (ESN or IMEI) is required for activation in operation 4326.

Third, it may be determined that there is some error, such as there being no coverage available for the particular data given. In this case, the user is transferred to an activation specialist from the cellular service provider in operation 4332. Fourth, the activation status may show that the cellular phone has already been activated, either by this system or by a third party (such as the dealer that sold the phone). In that case, based on the decision in operation 4336, either the user will be logged into the main customer service line (in operation 4340), the call will be transferred to a human (in operation 4332), or the call will be terminated (in operation 4338).

Fifth, the activation status may show that the process of activating the cellular phone has already started, either by this system or by a third party (such as the dealer that sold the phone), and all that remains to be done is the collection of information that cannot be done by the automated system. In that case, the call will be transferred to a human (in operation 4334).

Figures 4, 4C:
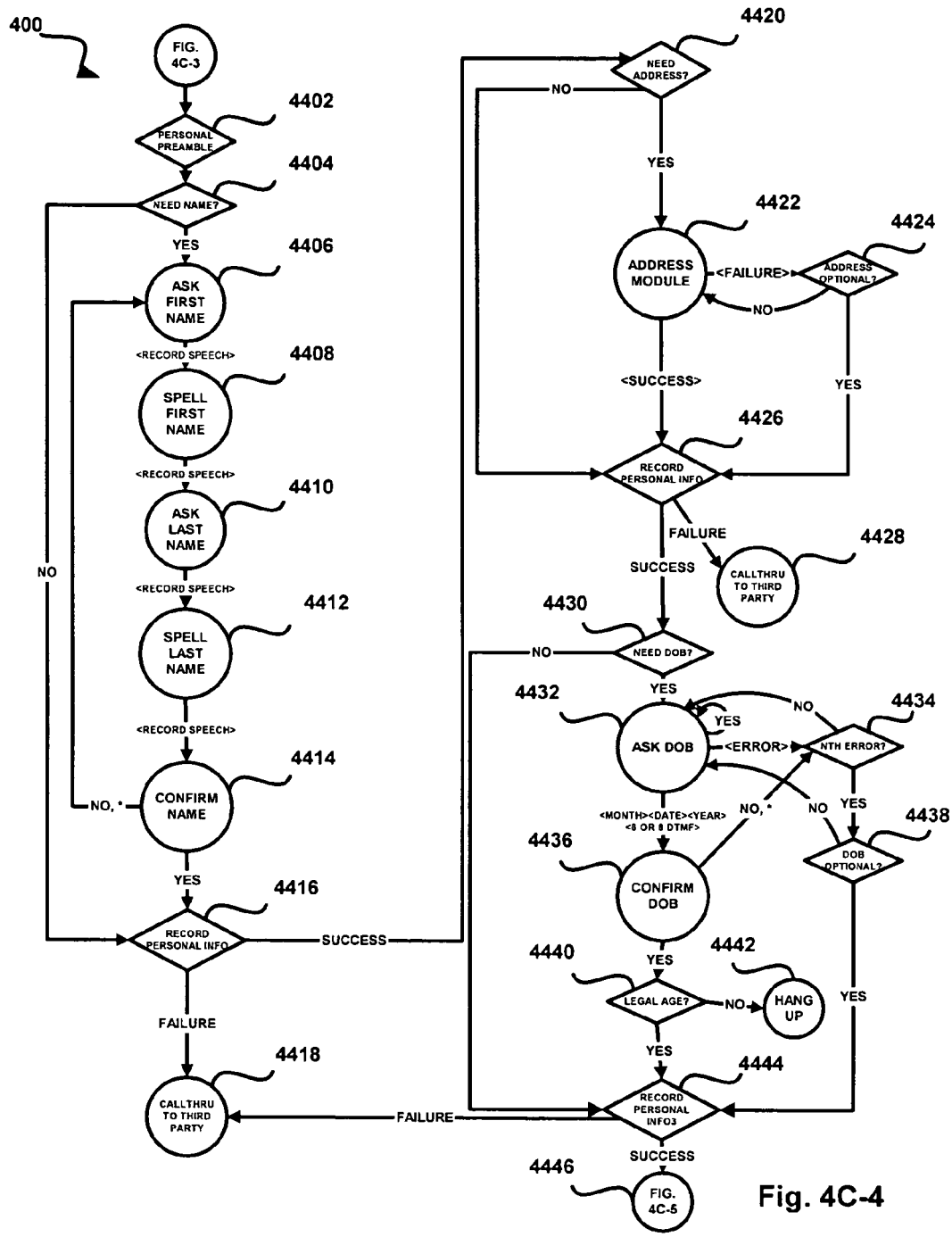

FIG. 4C-4 illustrates the continuation of the activation process in which more information is gathered from the user. The need for more personal information is vocalized in operation 4402, and it is then determined whether the user's name is necessary to continue in operation 4404. If it is, the user is asked to state his first name in operation 4406, spell his first name in operation 4408, state his last name in operation 4410, and spell his last name in operation 4412, after which the recorded name and spelling are repeated and the user is asked to confirm that it is correct in operation 4414.

If the user indicates that the recorded name and spelling are incorrect, the user is taken back to operation 4406 where the user is again asked for his name. If the user confirms the recorded name or if it is determined in operation 4404 that a name is not required, the system attempts to store the name and spelling in the database. Then, it is determined whether the personal information has been successfully recorded in operation 4416. If the recording has been a failure, the user is transferred to an activation specialist from the cellular service provider in operation 4418, otherwise in operation 4420 it is determined whether the user should be asked to give their address.

If the user should be asked to give their address, the address module in operation 4422 asks the user for their address, and determines whether the address was successfully captured. If not, it is again determined whether the address is necessary in operation 4424 and the process proceeds accordingly by either asking the user for the billing address again in operation 4422 or by skipping that operation and proceeding to store the information in the database. Operation 4426 is a determination of whether the recording of the personal information has been a success or a failure.

The process also proceeds in operation 4426 if it is concluded in operation 4420 that an address is not necessary to proceed. If the recording of personal information is deemed a failure in operation 4426, the user is transferred to an activation specialist from the cellular service provider in operation 4428, otherwise in operation 4430, it is next determined whether the system should ask for the user's date of birth. Similar to various previous operations, the present operations attempt to store the information in the database, and then check if the storage was successful.

If the user does not need to be asked for their date of birth, the system again attempts to store that information in the database, and then checks whether the recorded personal information up to that point has been a success or a failure in operation 4444. If it has been successful, the process continues to FIG. 4C-5 in operation 4446, otherwise the user is transferred to an activation specialist from the cellular service provider in operation 4418.

If the user should be asked for their date of birth, the process continues in operation 4432 where the user is asked if he will give his date of birth and if so what that date of birth is. If there is an error, such as an invalid birth date being entered, and the number of errors has exceeded a predetermined threshold per operation 4434, it is again determined whether the date of birth is optional in operation 4438. If it is not optional, the user is again asked for his date of birth in operation 4432, otherwise the process proceeds in operation 4444 as described above.

If the threshold for the number of attempts to enter a valid birth date is not exceeded in operation 4434 or if the date of birth is not optional in operation 4438, the user is again asked for his date of birth in operation 4432. If a valid birth date is entered, the recorded date of birth is confirmed with the user in operation 4436. If the user fails to confirm, he is taken back to operation 4434 as described above, otherwise it is next determined whether he is of legal age as is predetermined in operation 4440. If the user is not of legal age, the activation process is terminated in operation 4442, otherwise the process continues in operation 4444 as described above.

Figures 4, 4C, 5:
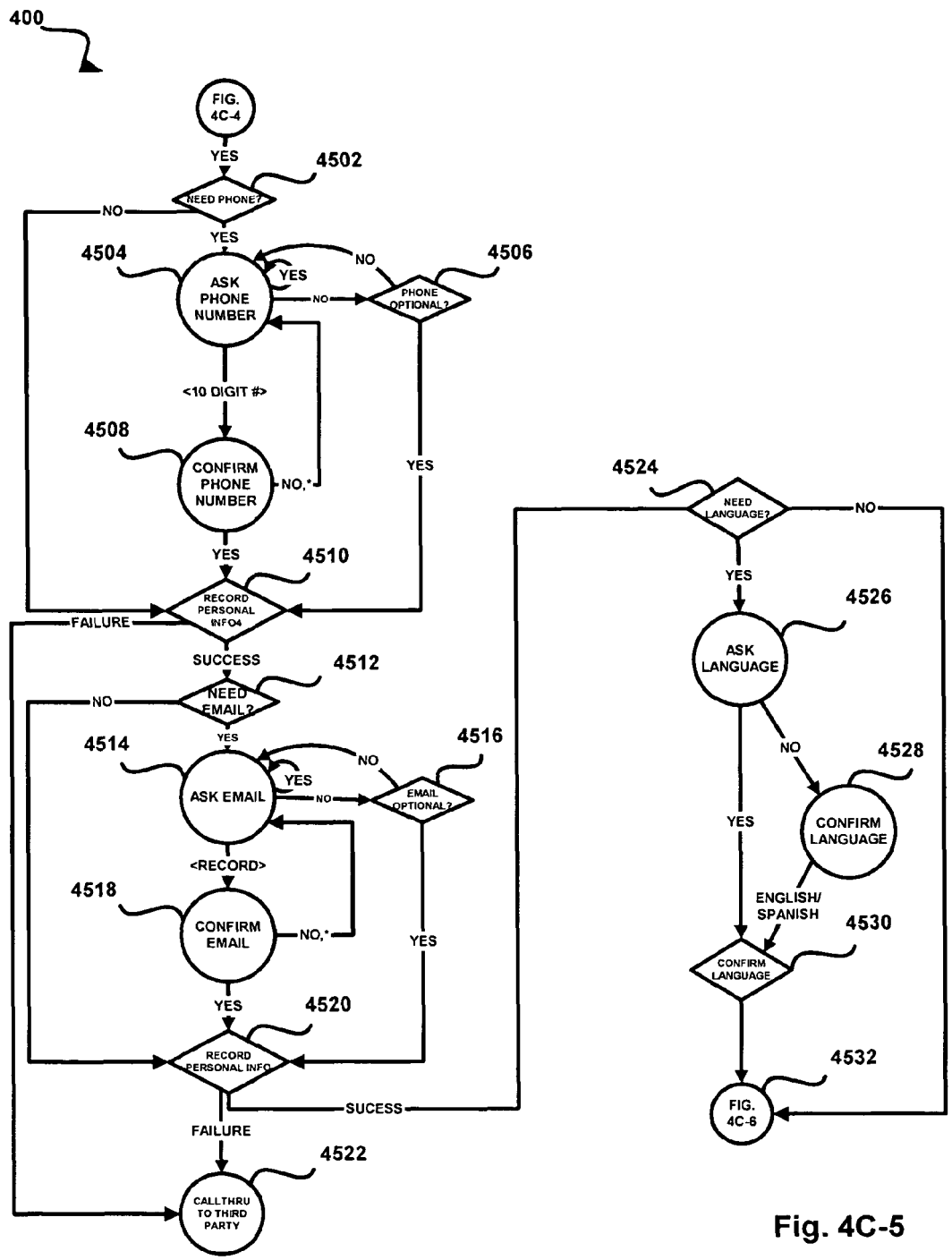
FIG. 5 illustrates an exemplary method for providing a voice application, in accordance with another embodiment.
Figures 4, 4C, 5, 6:
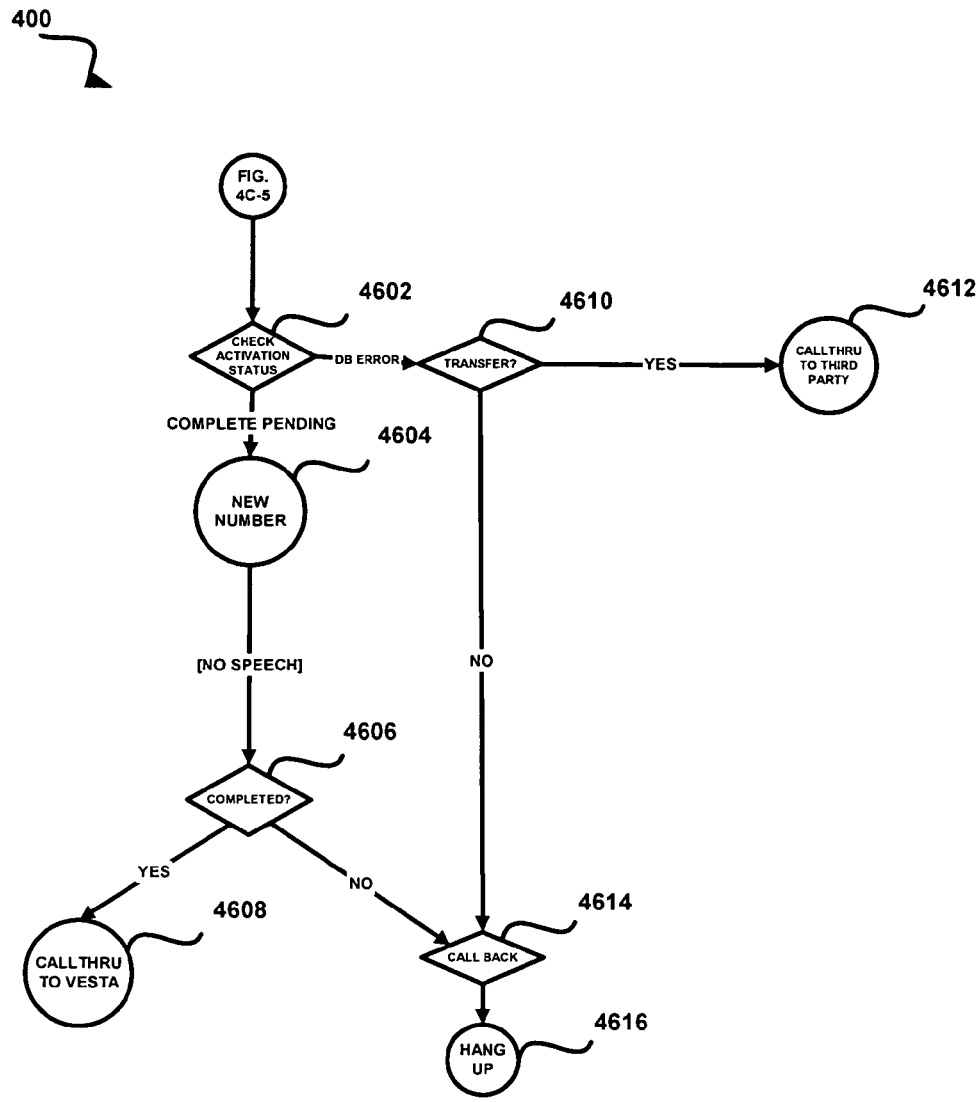
Figure 5:
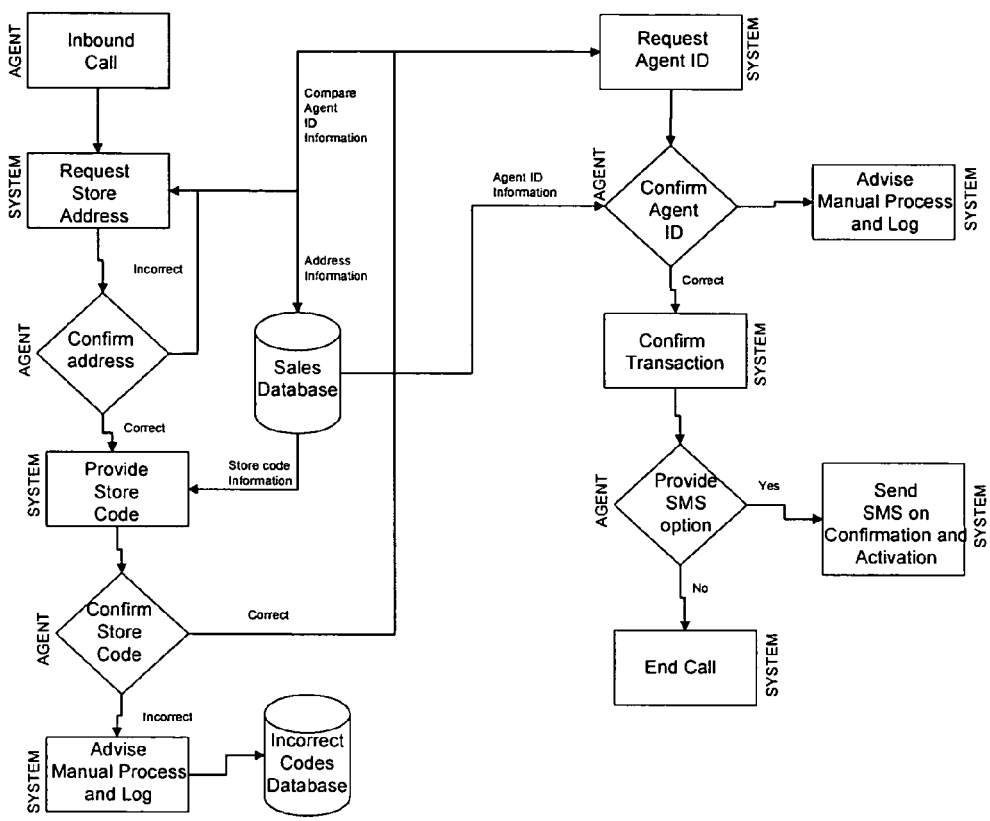

Now proceeding to FIG. 4C-5, the activation process continues by determining if a phone number for the user is required to proceed 4502, asking the user to state or enter the phone number accordingly in operation 4504, confirming the recorded phone number in operation 4508 or determining if the phone number is optional if no phone number is given in operation 4506, and recording the personal information given thus far in operation 4510.

If the personal information has failed to be recorded, the user is transferred to an activation specialist from the cellular service provider in operation 4522. Otherwise, it is next determined whether an email address is also necessary to proceed in operation 4512. The user is asked to state his email address accordingly in operation 4514, confirmation of the recorded email is then required by the user if an email is given in operation 4518 or it is again determined whether the email is optional if an email is not given in operation 4516, and the personal information given thus far is recorded in operation 4520.

If the recording is a failure, the user is transferred to an activation specialist from the cellular service provider in operation 4522, otherwise it is next determined whether information on the language preferred by the user is required to proceed in operation 4524. If it is not necessary, the activation process proceeds to FIG. 4C-6 in operation 4532. Otherwise, the user is asked whether he would like to use the same language for future communications in operation 4526. If the user indicates that they do want to use the same language, the user is asked to confirm the same in operation 4530. If the user indicates that they do not want to use the same language, they are asked if they want to use English or Spanish in operation 4528, and then are asked to confirm their choice in operation 4530. Next, the user's choice of language is repeated in operation 4530, and the activation process continues as set forth in FIG. 4C-6.

FIG. 4C-6 illustrates the conclusion of the voice-activated portion of the activation process by checking the activation status in operation 4602, which optionally includes entering the user's information into the system. Of course, the user's information may be entered into the system in previous operations. If the check activation status results in a database error, the user may either be transferred in operation 4610 to an activation specialist from the cellular service provider in operation 4612, or the user may be told to call back after a specified period of time in operation 4614. To such end, the call may be terminated so that time is given for the information to be entered into the system in operation 4616.

If the check activation status results in either a completed or pending activation, a new telephone number is vocalized to the user in operation 4604. If the status is completed per decision 4606, the user is transferred to a live person in order to finalize the activation process in operation 4608. Otherwise, a pending activation will result in the user being told to call back at a later time in operation 4614.

FIG. 5 illustrates an exemplary method 500 for providing a voice application, in accordance with one embodiment. As an option, the present method 500 may be implemented in the context of the architecture of FIGS. 1 and 2. Still yet, the exemplary method 500 may optionally be implemented in the context of the foregoing methods. Of course, the method 500 may be implemented in any desired context.

Following is a description related to the flow of the method 500 shown in FIG. 5. In the present embodiment, to enhance in-store sales efficiency, the present technique may provide a simple voice application to augment the activations process (see previous figures and related description, for example). A store representative application may allow a sales person to "log" a handset for subsequent customer activation. Such sales person may either log onto the Internet or call into the application which would ask for only a few pieces of information. See Table 3, for example.

TABLE 1

1. the 15-digit serial number associated with the phone handset (ESN or IMEI, etc.];
2. the store location address (i.e. this may be accomplished by asking for a ZIP code and disambiguating, etc.);
3. confirmation of the store code;
4. the unique agent ID; and/or
5. agent cell phone information.

The result may be that the sales person is able to get credit for the prepaid handset sales without spending his/her sales time going through the handset activation process on the in-store terminal.

When the customer calls to activate their handset, the present system may match the electronic serial number (ESN or IMEI) provided by the customer with an IMEI previously provided by the sales person. Such technique may then pass along the appropriate dealer/agent code to the backend billing system during the automated activation process for proper commission assignment.

The in-store sales representative application can be accessed via a voice application or via a web page. The application may take approximately five (5) minutes (more or less) to complete via either modality.

Optionally, basic reporting to detect fraud and provide store managers with sales information may be provided via a web-based reporting tool. In addition, an aggregate total sales volume via retail stores report may be provided via a web-based reporting tool. Thus, the present system may provide both a voice-enabled interactive voice response (IVR) version and a web version of this tool.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for activating a cellular phone account utilizing automated speech recognition, comprising:
   receiving a plurality of user supplied information over a network utilizing automated speech recognition;
   storing the information in a memory database; and
   determining if the stored information is sufficient for cellular phone activation, wherein if sufficient, automatically activating the cellular phone account based on the information received utilizing the automated speech recognition, and wherein, if not sufficient, continuing to store the information in the memory database without activating the cellular phone and allowing the user to resume an interrupted activation session without repeating the previously stored information.

2. The method as recited in claim 1, wherein in response to a predetermined criteria being met, connecting to a human for information collection.

3. The method as recited in claim 2, wherein the predetermined criteria is met upon a difficulty arising with the receipt of the information utilizing the automated speech recognition, where the difficulty includes a problem with the automated speech recognition or the user.

4. The method as recited in claim 1, wherein the information received utilizing automated speech recognition includes a name of a user, wherein the name includes a natural pronunciation of the name and a spelling of the name for increasing the accuracy of the automated speech recognition of the name.

5. The method as recited in claim 1, wherein the information received utilizing automated speech recognition includes a zip code of the user.

6. The method as recited in claim 5, wherein the zip code is utilized for identifying coverage information associated with the cellular phone account.

7. The method as recited in claim 5, wherein the zip code is utilized for billing associated with the cellular phone account.

8. The method as recited in claim 1, wherein the information includes aspects of the cellular phone account to be activated.

9. The method as recited in claim 1, wherein utterances of the user during the receipt of the information is stored.

10. The method as recited in claim 9, further comprising connecting to a human for manual transcription of the utterances after the receipt of the information utilizing the automated speech recognition.

11. The method as recited in claim 9, wherein in response to a predetermined criteria being met, connecting to a human for manual transcription of the utterances.

12. The method as recited in claim 11, wherein the predetermined criteria is met upon a difficulty arising with the receipt of the information utilizing the automated speech recognition.

13. The method as recited in claim 1, wherein the cellular phone account may include a pre-paid account.

14. The method as recited in claim 1, wherein marketing information is audibly transmitted to the user over the network.

15. The method as recited in claim 1, wherein instructional information is audibly transmitted to the user over the network for facilitating the programming of the cellular phone by the user.

16. The method as recited in claim 15, wherein the instructional information is tailored based on the cellular phone of the user.

17. The method as recited in claim 1, wherein a first sub-set of the information is required for the activation of the cellular phone account and a second sub-set of the information is not required for the activation of the cellular phone account.

18. The method as recited in claim 17, wherein the cellular phone account is activated despite a failure in the receipt of the second sub-set of the information.

19. The method as recited in claim 1, wherein the method is started upon the user calling a customer service line from a phone with an unrecognized caller identification number.

20. The method as recited in claim 1, wherein audible confirmations are conditionally transmitted to the user over the network, based on a confidence score associated with the information received from the user.

21. The method as recited in claim 1, wherein additional information is requested from the user, upon a delay occurring by a backend subsystem carrying out the automated speech recognition.

22. The method as recited in claim 1, wherein the method is accessible from a main menu when the user calls a customer service line from a recognized cellular phone.

23. The method as recited in claim 1, wherein the method is accessible from a main menu when the user calls a customer service line from a phone with a recognized caller identification number.

24. The method as recited in claim 1, wherein a salespersons identifier is used to assign a credit to a salesperson for the activation of the cellular phone account.

25. A non-transitory computer program product embodied on a computer readable storage medium for activating a cellular phone account utilizing automated speech recognition, comprising:
   computer code for receiving a plurality of user supplied information over a network utilizing automated speech recognition;
   computer code for storing the information in a memory database; and
   computer code for determining if the storied information is sufficient for cellular phone activation, wherein if sufficient, computer code for automatically activating the cellular phone account based on the information received utilizing the automated speech recognition, and wherein, if not sufficient, computer code for continuing to store the information in the memory database without activating the cellular phone and allowing the user to resume an interrupted activation session without repeating the previously stored information.

26. The computer program of claim 25, wherein a salespersons identifier is used by a backend billing system to assign a credit to a salesperson for the activation of the cellular phone account.

27. A method for activating a cellular phone account utilizing automated speech recognition, comprising:
- receiving a plurality of user supplied information over a network utilizing automated speech recognition;
- transmitting audible marketing information to the user over the network;
- transmitting menu information to the user over the network, the menu describing an account balance option, a change rate plan option, a purchase minutes option, an activate phone option, and a customer service option;
- communicating audible account balance information over the network, upon selection of the account balance option utilizing speech recognition;
- communicating audible change rate plan information over the network, upon selection of the change rate plan option utilizing speech recognition;
- communicating audible purchase minutes information over the network, upon selection of the purchase minutes option utilizing speech recognition;
- communicating audible customer service information over the network, upon selection of the customer service option utilizing speech recognition;
- upon selection of the activate phone option:
  - receiving name information associated with the user over the network utilizing automated speech recognition, wherein the name information includes a name of the user, and the name includes a natural pronunciation of the name and a spelling of the name for increasing the accuracy of the automated speech recognition of the name,
  - storing the name information in a memory database,
  - receiving address information associated with the user over the network utilizing automated speech recognition,
  - storing the address information in the memory database,
  - receiving date of birth information associated with the user over the network utilizing automated speech recognition,
  - determining whether the date of birth information indicates a legal age,
  - storing the date of birth information in the memory database, and
  - determining if the stored information is sufficient for cellular phone activation, wherein if sufficient, automatically activating the cellular phone account based on the name information, the address information, and the date of birth information received utilizing the automated speech recognition, if it is determined that the date of birth information indicates a legal age, and wherein, if not sufficient, continuing to store the received information in the memory database without activating the cellular phone and allowing the user to resume an interrupted activation session without repeating the previously stored information.

28. The system of claim 27, wherein a salespersons identifier is used by a backend billing system to assign a credit to a salesperson for the activation of the cellular phone account.

* * * * *